(12) United States Patent
Liu et al.

(10) Patent No.: US 12,014,051 B2
(45) Date of Patent: Jun. 18, 2024

(54) IO PATH DETERMINATION METHOD AND APPARATUS, DEVICE AND READABLE STORAGE MEDIUM

(71) Applicant: INSPUR SUZHOU INTELLIGENT TECHNOLOGY CO., LTD., Jiangsu (CN)

(72) Inventors: Zhikui Liu, Jiangsu (CN); Yanqing Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/276,212

(22) PCT Filed: Dec. 30, 2021

(86) PCT No.: PCT/CN2021/142851
§ 371 (c)(1),
(2) Date: Aug. 7, 2023

(87) PCT Pub. No.: WO2023/019858
PCT Pub. Date: Feb. 23, 2023

(65) Prior Publication Data
US 2024/0036734 A1   Feb. 1, 2024

(30) Foreign Application Priority Data

Aug. 18, 2021  (CN) .......................... 202110945840.5

(51) Int. Cl.
G06F 3/06 (2006.01)
(52) U.S. Cl.
CPC .......... *G06F 3/0611* (2013.01); *G06F 3/0635* (2013.01); *G06F 3/0683* (2013.01)

(58) Field of Classification Search
CPC ..... G06F 3/0611; G06F 3/0635; G06F 3/0683
See application file for complete search history.

(56) References Cited

U.S. PATENT DOCUMENTS

| | | |
|---|---|---|
| 6,601,128 B1 | 7/2003 | Burton |
| 10,089,885 B1 | 10/2018 | Beckman |
(Continued)

FOREIGN PATENT DOCUMENTS

| | | |
|---|---|---|
| CN | 107317765 A | 11/2017 |
| CN | 108459977 A | 8/2018 |
(Continued)

OTHER PUBLICATIONS

International Search Report and Written Opinion received for PCT Serial No. PCT/CN2021/142851 on Apr. 27, 2022, 11 pgs.
(Continued)

*Primary Examiner* — Eric Cardwell
(74) *Attorney, Agent, or Firm* — Merchant & Gould P.C.

(57) ABSTRACT

An IO path determination method and apparatus, and a device and a readable storage medium. The method comprises: determining a target volume of an IO request, and acquiring a path level of the target volume; when the path level is a host path level, sending the IO request to a preset preferable controller; when the path level is a back-end path level, selecting a target controller from controllers by using a consistent hashing algorithm, and sending the IO request to the target controller; and when the path level is a fault level, determining that a fault occurs in an IO path. An IO path is determined by means of setting different path levels for a volume and in conjunction with a consistent hashing algorithm, such that loads of controllers in a storage system can be effectively balanced.

20 Claims, 3 Drawing Sheets

(56) References Cited

U.S. PATENT DOCUMENTS

| | | | |
|---|---|---|---|
| 2002/0040411 A1 | 4/2002 | Iwatani et al. | |
| 2006/0048018 A1* | 3/2006 | Hosoya | G06F 11/0727 |
| | | | 714/48 |
| 2013/0067125 A1 | 3/2013 | Rizzo | |
| 2015/0207785 A1* | 7/2015 | Sathaye | H04L 9/0894 |
| | | | 713/168 |
| 2020/0366620 A1* | 11/2020 | Stein | H04L 45/302 |
| 2021/0176310 A1* | 6/2021 | Liang | H04L 41/0668 |

FOREIGN PATENT DOCUMENTS

| | | |
|---|---|---|
| CN | 112153129 A | 12/2020 |
| CN | 113407466 A | 9/2021 |
| JP | 2012190151 A | 10/2012 |

OTHER PUBLICATIONS

Chinese Search Report received for CN Serial No. 2021109458405 on Sep. 22, 2021, 3 pgs.

* cited by examiner

IO PATH DETERMINATION METHOD AND APPARATUS, DEVICE AND READABLE STORAGE MEDIUM

CROSS-REFERENCE TO RELATED APPLICATION

The present application is a National Stage Filing of PCT International Application No. PCT/CN2021/142851 filed on Dec. 30, 2021, which claims priority to the Chinese patent application No. 202110945840.5, filed before the China National Intellectual Property Administration (CNIPA) on Aug. 18, 2021, which is incorporated herein by reference in its entirety.

TECHNICAL FIELD

The disclosure relates to the technical field of storage, in particular to an Input/Output (IO) path determination method and apparatus, a device and a readable storage medium.

BACKGROUND

In a real production environment of storage, there are a disk frame, a controller belonging to a backend disk, a controller not belonging to a backend disk, and a host initiating an Input/Output (IO) request. If the host wants to access the backend disk, it needs to send the IO request to the controller, and then the controller processes the IO request, so as to realize data drop or data access.

Generally, in a storage system, there is a plurality of controllers, and the IO request sent by the hosts is processed by the controllers, so that the IO request is processed. However, the inventor has realized that different hosts may select the same controller to process the IO request, which causes some controllers to be busy and some others to be idle, resulting in unbalanced resource usage and no guarantee of IO response speed.

SUMMARY

The disclosure provides an IO path determination method, which includes the following operations.

A target volume of an IO request is determined, and a path grade of the target volume is acquired.

When the path grade is a host path grade, the IO request is sent to a preset optimal controller.

When the path grade is a backend path grade, a target controller is selected from the controllers by using the consistent hashing algorithm, and the IO request is sent to the target controller.

When the path grade is a fault grade, an IO path fault is determined.

In some embodiments, that a target controller is selected from the controllers by using the consistent hashing algorithm includes the following operation.

The target controller is selected from the controllers belonging to the back end by using the consistent hashing algorithm.

In some embodiments, that the IO request is sent to the target controller includes the following operations.

When the target controller includes a plurality of threads, a target thread is selected from the plurality of threads by using the consistent hashing algorithm.

The IO request is sent to the target thread.

In some embodiments, that when the path grade is a backend path grade, a target controller is selected from the controllers by using the consistent hashing algorithm, and the IO request is sent to the target controller includes the following operations.

When the path grade is a backend path grade and a data volume corresponding to the IO request is greater than a threshold value, the IO request is divided into a plurality of IO sub-requests.

Target threads matched with the IO sub-requests in quantity are selected from a plurality of threads corresponding to the controllers by using the consistent hashing algorithm, and the IO sub-requests which are correspondingly distributed are respectively sent to the target threads.

In some embodiments, that a path grade of the target volume is acquired includes the following operation.

A host path grade table, a backend path grade table and a fault grade table are traversed to determine the path grade of the target volume.

In some embodiments, the IO path determination method further includes the following operation.

When the controller is offline or online, the host path grade table, the backend path grade table and the fault grade table are updated according to path grade control information of the controller.

In some embodiments, that when the path grade is a backend path grade, a target controller is selected from the controllers by using the consistent hashing algorithm includes the following operation.

When the path grade is a backend path grade and the quantity of the controllers changes, a target controller is selected from the controllers with the changed quantity by using the consistent hashing algorithm after parameter adjustment.

The disclosure further provides an IO path determination apparatus, which includes a path grade determination module, a host path determination module, a backend path determination module and a fault path determination module.

The path grade determination module is configured to determine a target volume of an IO request, and acquire a path grade of the target volume.

The host path determination module is configured, when the path grade is a host path grade, to send the IO request to a preset optimal controller.

The backend path determination module is configured, when the path grade is a backend path grade, to select a target controller from the controllers by using a consistent hashing algorithm, and to send the IO request to the target controller.

The fault path determination module is configured, when the path grade is a fault grade, to determine an IO path fault.

The disclosure further provides an electronic device, which includes a memory and one or more processors, the memory stores computer-readable instructions which, when executed by the one or more processors, enable the one or more processors to execute the steps of the IO path determination method in any one of the foregoing embodiments.

The disclosure further provides one or more non-volatile computer-readable storage media storing computer-readable instructions which, when executed by one or more processors, enable the one or more processors to execute the steps of the IO path determination method in any of the foregoing embodiments.

BRIEF DESCRIPTION OF THE DRAWINGS

In order to describe the technical solutions in the embodiments of the disclosure more clearly, the drawings required to be used in descriptions about the embodiments or the relevant art will be simply introduced below, obviously, the drawings described below are only some embodiments of the disclosure, and other drawings may further be obtained by those of ordinary skill in the art according to the drawings without creative work.

DETAILED DESCRIPTION OF THE EMBODIMENTS

In order to make the solutions of the disclosure better understood by those skilled in the art, the disclosure will be described below in detail in combination with the drawings and the specific implementation modes. It is apparent that the above-described embodiments are only some, but not all, embodiments of the disclosure. All other embodiments obtained by those of ordinary skill in the art based on the embodiments of the disclosure without creative efforts shall fall within the protection scope of the disclosure.

Figure 1:
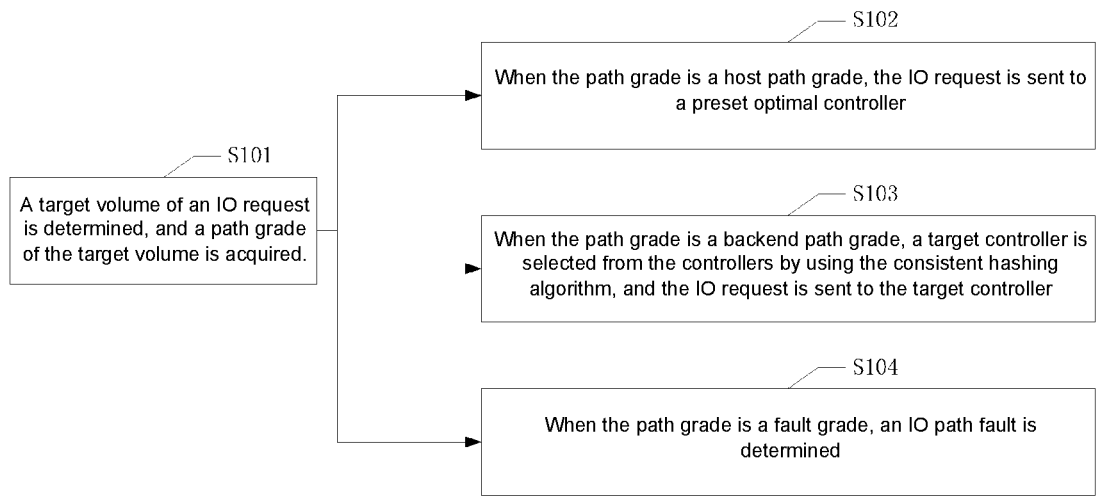
FIG. 1 is an implementation flow chart of an Input/Output (IO) path determination method provided by the disclosure according to one or more embodiments.

Referring to FIG. 1, FIG. 1 is a flow chart of an IO path determination method in some embodiments of the disclosure, the IO path determination method may be applied to a host that needs IO access to a disk (specifically, the host may be a physical host or a virtual host), and the method includes the following step.

In S101, a target volume of an IO request is determined, and a path grade of the target volume is acquired.

Figure 2:
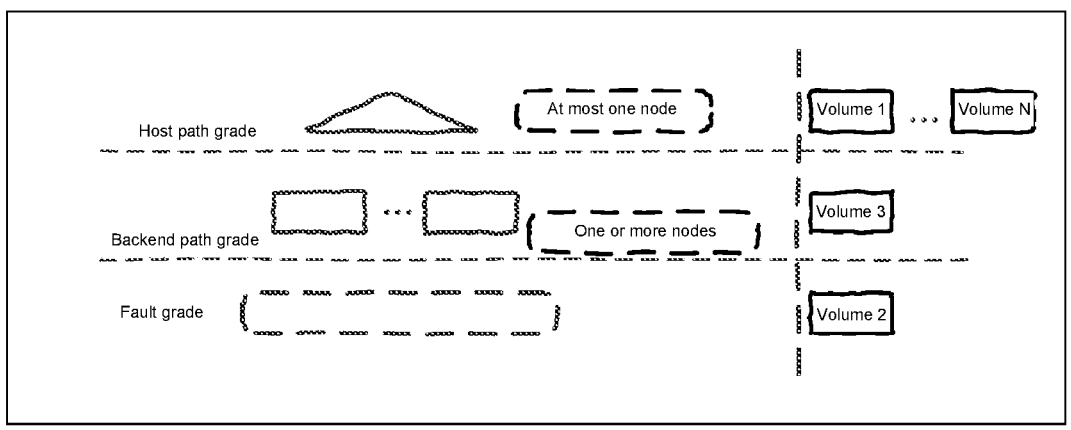
FIG. 2 is a schematic diagram of a path weight grade according to one or more embodiments.

Referring to FIG. 2, FIG. 2 is a schematic diagram of a path weight grade in some embodiments of the disclosure. In the embodiments provided by the disclosure, different path grades may be set for different volumes in advance, for example, corresponding path grade marks are marked for different volume, or a path grade lookup table is established. The path grades may include a host path grade, a backend path grade and a fault grade. The host path grade may correspond to a controller, that is, the volume of the host path grade corresponds to a node; the backend path grade may correspond to one or more controllers, that is, the volume of the backend path grade corresponds to one or more nodes; and the fault grade indicates the volume whose access path is faulty or inaccessible.

After the host determines the target volume of the IO request, a path grade of the target volume may be specified first. Specifically, the path grade of the target volume may be determined by path grade markers or by traversing and querying the path grade lookup table.

For ease of management, different tables may be set for different path grades, therefore, that S101, a path grade of the target volume is acquired may include the following step: a host path grade table, a backend path grade table and a fault grade table are traversed to determine the path grade of the target volume.

Furthermore, when the controller is offline or online, the host path grade table, the backend path grade table and the fault grade table are updated according to path grade control information of the controller. In this way, it can avoid that the offline controller is selected or one or some newly online controllers are ignored when the controller is offline or online.

In the above embodiment, there is no restriction as to whether the IO request is specifically an input or output to data in the disk.

The IO path determination method may further include the following step.

In S102, when the path grade is a host path grade, the IO request is sent to a preset optimal controller.

When the path grade of the target volume is a host path grade, the IO request may be directly sent to a preset optimal controller. The preset optimal controller is disposed for each host. For example, for a storage system, controllers are distributed in three areas, namely, A, B and C, for the hosts belonging to the A area, the controller belonging to the A area may be disposed as the preset optimal controller to shorten the network access distance. Different hosts may be configured with different preset optimal controllers.

The IO request is sent to the preset optimal controller, and the IO path at this time is: host-optimal controller-target volume. That is, the IO this time is carried out on this path.

The IO path determination method may further include the following step.

In S103, when the path grade is a backend path grade, a target controller is selected from the controllers by using the consistent hashing algorithm, and the IO request is sent to the target controller.

If the path grade of the target volume is backend path grade, generally, the backend path of a volume often corresponds to a plurality of controllers. In order to realize load balancing of the controllers, when the target controller is selected from the plurality of controllers, the target controller may be selected from the controllers by using the consistent hashing algorithm. Specifically, for how the target controller is selected by using the consistent hashing algorithm, reference may be made to a specific implementation process in which objects are randomly selected by using the consistent hashing algorithm, and no elaboration will be made here.

After the target controller is selected, the IO request is sent to the target controller. Correspondingly, the IO access path this time is: host-target controller-target volume. That is, the IO this time is carried out on this path.

The IO path determination method may further include the following step.

In S104, when the path grade is a fault grade, an IO path fault is determined.

If it is determined that the path grade is a fault grade, it is determined that the target volume has no corresponding access path or cannot be accessed (for example, the target volume is faulty, or all controllers capable of realizing disk reaching belonging to the target volume are offline, etc.).

If it is determined that the path grade is a fault grade, the IO request does not need to be issued again, the IO path fault is directly specified, and an IO error is determined.

According to the IO path determination method provided by the disclosure, the target volume of the IO request is determined, and the path grade of the target volume is acquired; when the path grade is a host path grade, the IO request is sent to the preset optimal controller; when the path grade is a backend path grade, the target controller is selected from the controllers by using the consistent hashing algorithm, and the IO request is sent to the target controller; and when the path grade is a fault grade, the IO path fault is determined.

When an IO request needs to be issued, a target volume of the IO request is firstly determined, and the path grade of the target volume is acquired. When the path grade is a host path grade, the IO request is only needed to be directly sent to a preset optimal controller. When the path grade is a backend path grade, the target controller is selected from the controllers by using the consistent hashing algorithm, and the IO request is sent to the target controller. Because the consistent hashing algorithm may cause the minimum change when hash output space changes, for example, adding or removing a storage device has minimal impact on the mapping between an original storage device and a user, meanwhile, the consistent hashing algorithm may realize the ability of random selection, therefore, the load of each controller may effectively be balanced when the target controller is selected. When the path grade is a fault grade, an IO path fault is directly determined. That is, by setting different path grades for a volume and specifying the IO path in combination with the consistent hashing algorithm, the load of each controller in the storage system may effectively be balanced.

It is to be noted that in addition to the above embodiment, the disclosure further provides more embodiments. In the following embodiment, the same steps or corresponding steps as those in the previous embodiment may be mutually referenced, and the corresponding beneficial effects may also be mutually referenced.

In some embodiments, the IO path determination method includes the following step: the target volume of an IO request is determined, and the path grade of the target volume is acquired; it is determined that the path grade is a host path grade, and the IO request is sent to a preset optimal controller.

In some embodiments, the IO path determination method includes the following step: the target volume of an IO request is determined, and the path grade of the target volume is acquired; it is determined that the path grade is a backend path grade, a target controller is selected from the controllers by using the consistent hashing algorithm, and the IO request is sent to the target controller.

In some embodiments, the IO path determination method includes the following step: the target volume of an IO request is determined, and the path grade of the target volume is acquired; it is determined that the path grade is a fault grade, an IO path fault is determined.

Figure 3:
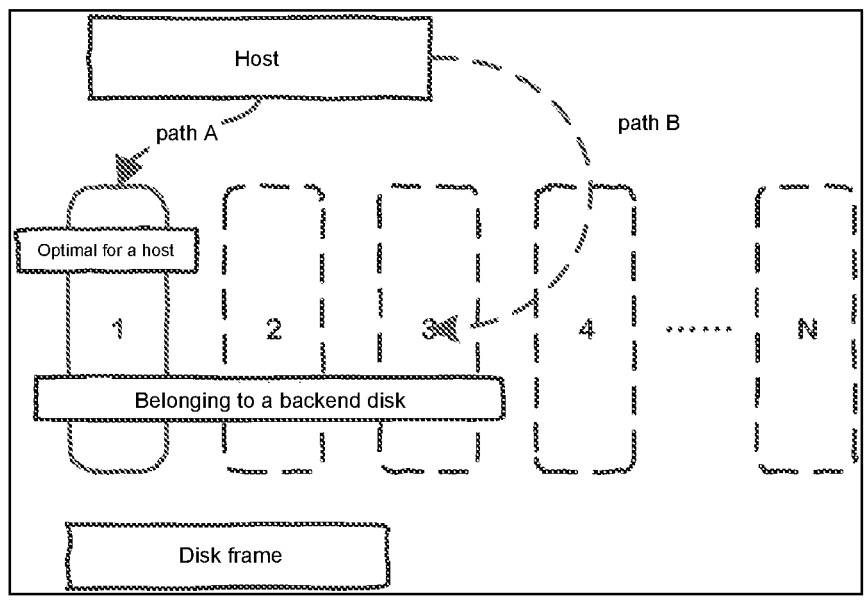
FIG. 3 is a schematic diagram of an IO path according to one or more embodiments.

Considering that in practical applications, the backend disk has controller ownership, so it may only realize disk reaching from some controllers. The disclosure provides some embodiments, as shown in FIG. 3, and FIG. 3 is a schematic diagram of an IO path. Path A corresponds to host-optical controller-target volume; in path B, node 4 does not belong to the controller belonging to the backend disk, therefore, even if the IO request is sent to the node 4, the node 4 needs to forward the IO request to node 2 or 3, which then reaches the belonging disk through node 2 or 3, that is, path B may be specifically: host-node 4-node 2-target volume. It is to be noted that in the disclosure, the nodes are equivalent to controllers.

Figure 4:
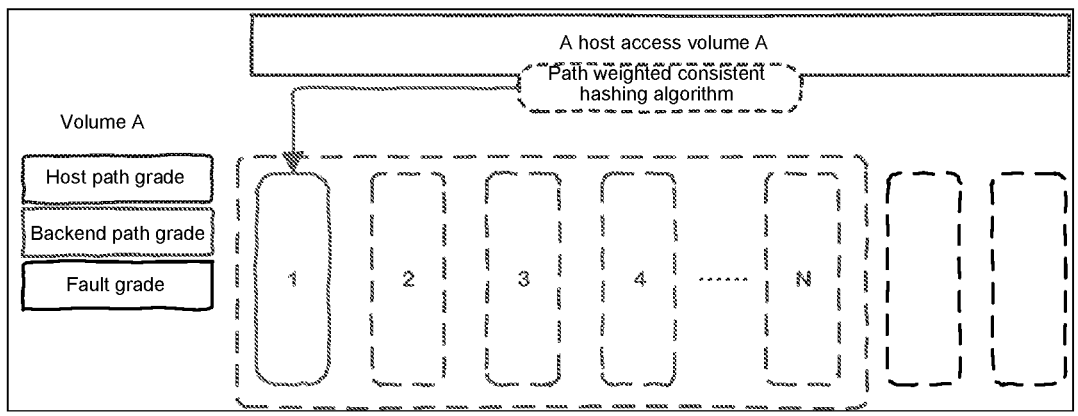
FIG. 4 is a schematic diagram of selection range of a target controller in an IO path determination method according to one or more embodiments.

To avoid controller forwarding, the target controller may only be selected from the controllers belonging to the backend disk. Specifically, referring to FIG. 4, FIG. 4 is a schematic diagram of selection range of a target controller in an IO path determination method in some embodiments, in previous S103, the mode that the target controller is selected from controllers by using the consistent hashing algorithm may specifically include: the target controller is selected from the controllers belonging to the backend disk by using the consistent hashing algorithm. The controllers 1 to N shown in FIG. 4 are the controllers belonging to the back end. Correspondingly, the determined IO path is: host-target controller-target volume. This path indicates there is no such situation that a controller is forwarded to another controller. In such a case, the practical problem of incomplete sharing of the backend disk may be solved, the forwarding operation of the controller is saved, and meanwhile, the load balancing capability of the consistent hashing algorithm is effectively brought into play.

In some embodiments, considering that in a practical application, a plurality of threads may be configured in a controller to handle the corresponding IO request. In order to realize effective load balancing, in S103, that the IO request is sent to the target controller specifically includes the following operations.

In S1, when the target controller includes a plurality of threads, a target thread is selected from the plurality of threads by using the consistent hashing algorithm.

In S2, the IO request is sent to the target thread.

That is, when the target controller includes a plurality of threads, a target thread is selected from the plurality of threads by using the consistent hashing algorithm, and the IO request is sent to the target thread. Therefore, in the target controller, load balancing with thread granularity is realized, and the performance of the target controller is maximized.

In some embodiments, considering that the data volume corresponding to some IO requests is large, in order to speed up the processing efficiency of such IO requests and to reduce the performance of a controller occupied for a long time, the IO requests may be segmented, so as to realize parallel processing of a plurality of IO sub-requests and to achieve the purpose of processing acceleration. Specifically, S103 includes the following operations.

In S1, when the path grade is a backend path grade and a data volume corresponding to the IO request is greater than a threshold value, the IO request is divided into a plurality of IO sub-requests.

In S2, target threads matched with the IO sub-requests in quantity are selected from a plurality of threads corresponding to the controllers by using the consistent hashing algorithm, and the IO sub-requests which are correspondingly distributed are respectively sent to the target threads.

For ease of description, the above two steps will be described in combination.

When the path grade is a backend path grade and it is found that a data volume corresponding to the IO request is greater than a threshold value, the IO request may be divided into a plurality of IO sub-requests. The magnitude of the threshold value may be set and adjusted according to actual requirements, and is not listed here. When the IO request is divided, segmenting may be carried out based on the data of the IO request to divide a plurality of IO sub-requests. Specifically, the IO request may be divided evenly according to a certain data volume.

After the IO requests are divided, target threads matched with the IO sub-requests in quantity are selected from a plurality of threads corresponding to the controllers by using the consistent hashing algorithm, and the IO sub-requests are respectively distributed to the target threads, namely, the IO sub-requests are sent to the target threads.

For example, when the quantity of the divided IO sub-requests is 5, the quantity of available controllers is 3, and each controller has 6 threads, 5 target threads are selected from the 18 threads by using the consistent hashing algorithm, and then the 5 IO sub-requests are respectively sent to the 5 target threads. It is to be noted that the 5 target threads may correspondingly belong to 2 controllers or 3 controllers.

Of course, when the target volume is at a host path grade, the IO request may be divided, and then the divided IO sub-requests are distributed to a plurality of threads in the optimal controller for processing. Or target threads may be selected from a plurality of threads by using the consistent hashing algorithm, and then the IO sub-request are distributed to the target threads for processing, so as to speed up the processing efficiency of the IO request.

In some embodiments, considering that in practical applications, the quantity of controllers may be changed due to a newly added controller or an existing controller getting offline because of a failure, in order to balance the load among the controllers after the quantity is changed, S103 may specifically include: when the path grade is a backend path grade and the quantity of the controllers changes, a target controller is selected from the controllers with the changed quantity by using the consistent hashing algorithm after parameter adjustment. Specifically, load balancing among the controllers with the changed quantity may be realized by adjusting the size of the output space of the consistent hashing algorithm.

In some embodiments, the disclosure further provides an IO path determination apparatus, and the IO path determination apparatus described below and the IO path determination method described above may be referred to in correspondence with each other.

Figure 5:
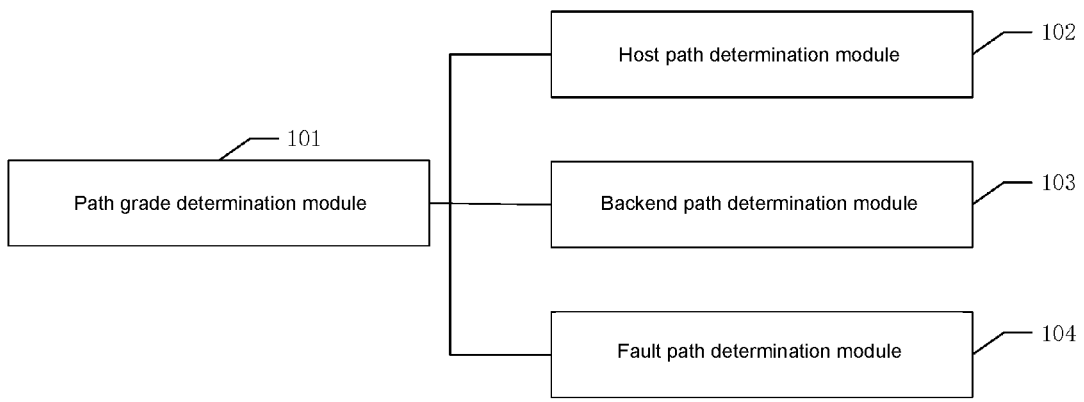
FIG. 5 is a schematic structure diagram of an IO path determination apparatus according to one or more embodiments.

Referring to FIG. 5, the IO path determination apparatus includes a path grade determination module 101, a host path determination module 102, a backend path determination module 103 and a fault path determination module 104.

The path grade determination module 101 is configured to determine a target volume of an IO request, and acquire a path grade of the target volume.

The host path determination module 102 is configured, when the path grade is a host path grade, to send the IO request to a preset optimal controller.

The backend path determination module 103 is configured, when the path grade is a backend path grade, to select a target controller from the controllers by using a consistent hashing algorithm, and to send the IO request to the target controller.

The fault path determination module 104 is configured, when the path grade is a fault grade, to determine an IO path fault.

According to the IO path determination apparatus provided by the embodiments of the disclosure, the target volume of the IO request is determined, and the path grade of the target volume is acquired; when the path grade is a host path grade, the IO request is sent to the preset optimal controller; when the path grade is a backend path grade, the target controller is selected from the controllers by using the consistent hashing algorithm, and the IO request is sent to the target controller; and when the path grade is a fault grade, the IO path fault is determined.

When an IO request needs to be issued, a target volume of the IO request is firstly determined, and the path grade of the target volume is acquired. When the path grade is a host path grade, the request is only needed to be directly sent to a preset optimal controller. When the path grade is a backend path grade, the target controller is selected from the controllers by using the consistent hashing algorithm, and the IO request is sent to the target controller. Because the consistent hashing algorithm may cause the minimum change when hash output space changes, for example, adding or removing a storage device has minimal impact on the mapping between an original storage device and a user, meanwhile, the consistent hashing algorithm may realize the ability of random selection, therefore, the load of each controller may effectively be balanced when the target controller is selected. When the path grade is a fault grade, an IO path fault is directly determined. That is, by setting different path grades for a volume and specifying the I/O path in combination with the consistent hashing algorithm, the load of each controller in the storage system may effectively be balanced.

In some embodiments, the backend path determination module 103 may specifically be configured to select a target controller from the controllers belonging to the back end by using the consistent hashing algorithm.

In some embodiments, the backend path determination module 103 may specifically be configured, when the target controller includes a plurality of threads, to select a target thread from the plurality of threads by using the consistent hashing algorithm, and to send the IO request to the target thread.

In some embodiments, the backend path determination module 103 may specifically be configured, when the path grade is a backend path grade and a data volume corresponding to the IO request is greater than a threshold value, to divide the IO request into a plurality of IO sub-requests, and to select target threads matched with the IO sub-requests in quantity are selected from a plurality of threads corresponding to the controllers by using the consistent hashing algorithm, and the IO sub-requests which are correspondingly distributed are respectively sent to the target threads.

In some embodiments, the path grade determination module 101 may be specifically configured to traverse a host path grade table, a backend path grade table and a fault grade table to determine the path grade of the target volume.

In some embodiments, the IO path determination apparatus may further include a path grade table update module.

The path grade table update module is configured, when the controller is offline or online, to update the host path grade table, the backend path grade table and the fault grade table according to path grade control information of the controller.

In some embodiments, the backend path determination module 103 may be specifically configured, when the path grade is a backend path grade and the quantity of the controllers changes, to select a target controller from the controllers with the changed quantity by using the consistent hashing algorithm after parameter adjustment.

In some embodiments, the disclosure further provides an electronic device, which includes a memory and one or more processors, the memory stores computer-readable instructions which, when executed by the one or more processors, enable the one or more processors to execute the steps of the IO path determination method in any one of the foregoing embodiments.

Figure 6:
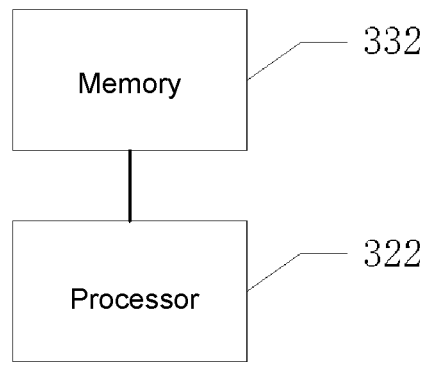
FIG. 6 is a schematic structure diagram of an electronic device according to one or more embodiments.

In some embodiments, as shown in FIG. 6, the electronic device includes a memory 332 and a processor 322.

The memory 332 is configured to store computer-readable instructions.

The processor 322 is configured, when execute computer-readable instructions, to implement the steps of the IO path determination method in any one of the foregoing embodiments.

Figure 7:
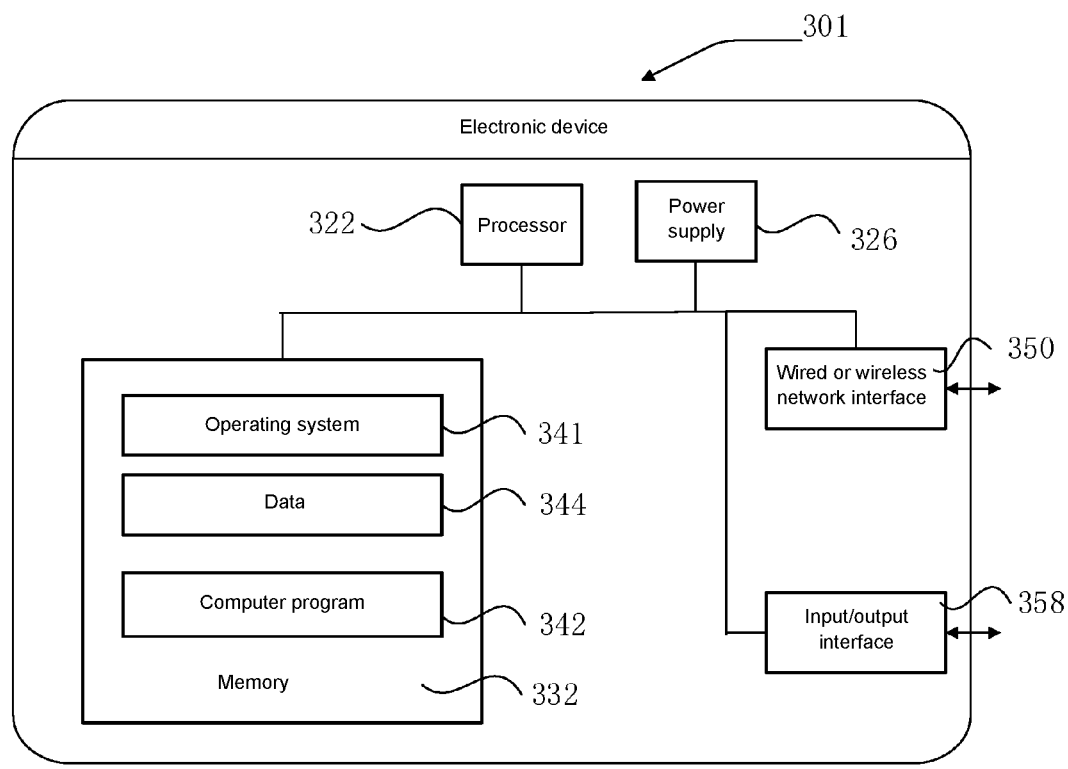
FIG. 7 is another schematic structure diagram of an electronic device according to one or more embodiments.

Specifically, referring to FIG. 7, FIG. 7 is a specific schematic structure diagram of an electronic device. In FIG. 7, the electronic device 301 may vary widely depending on configuration or performance, and may include one or more processors (Central Processing Units (CPUs)) 322 (such as one or more processors) and the memory 332. The memory 332 stores one or more computer applications 342 or data 344. The memory 332 may be a transient storage or a persistent storage. A program stored in the memory 332 may include one or more modules (not shown), each of which may include a series of instruction operations on a data processing device. Furthermore, the CPU 322 may be configured to communicate with the memory 332 to execute a series of computer-readable instruction operations in the memory 332 on the electronic device 301.

The electronic device 301 may further include one or more power supplies 326, one or more wired or wireless network interfaces 350, one or more input-output interfaces 358, and/or one or more operating systems 341.

The steps of the IO path determination method described above may be implemented by the structure of the electronic device 301.

The disclosure further provides one or more non-volatile computer-readable storage media storing computer-readable instructions which, when executed by the one or more processors, enable the one or more processors to execute the steps of the IO path determination method in any of the foregoing embodiments.

The non-volatile computer-readable storage medium may specifically be various readable storage media capable of storing program codes such as a U disk, a mobile hard disk, a Read-Only Memory (ROM), a Random Access Memory (RAM), a magnetic disk, or an optical disk.

Those skilled in the art may further be aware that the units and algorithmic steps of each example described in conjunction with the embodiments disclosed herein may be implemented in electronic hardware, computer software, or a combination of the two, and that the composition and steps of each example have been described generally by function in the above description in order to clearly illustrate the interchangeability of hardware and software. Whether these functions are performed in hardware or software depends on the specific application and design constraints of the technical solution. Those skilled in the art may use different methods for each particular application to achieve the described function, but such implementation should not be considered beyond the scope of the disclosure.

What is claimed is:

1. An Input/Output (TO) path determination method, comprising:
   determining a target volume of an IO request, and acquiring a path grade of the target volume;
   when the path grade is a host path grade, sending the IO request to a preset optimal controller;
   when the path grade is a backend path grade, selecting a target controller from controllers by using a consistent hashing algorithm, and sending the IO request to the target controller; and
   when the path grade is a fault grade, determining the IO path fault.

2. The IO path determination method according to claim 1, wherein selecting the target controller from the controllers by using the consistent hashing algorithm comprises:
   selecting the target controller from the controllers belonging to a back end by using the consistent hashing algorithm.

3. The IO path determination method according to claim 1, wherein sending the IO request to the target controller comprises:
   when the target controller comprises a plurality of threads, selecting a target thread from the plurality of threads by using the consistent hashing algorithm;
   sending the IO request to the target thread.

4. The IO path determination method according to claim 3, wherein that when the path grade is the backend path grade, selecting the target controller from the controllers by using the consistent hashing algorithm, and sending the IO request to the target controller comprises:
   when the path grade is the backend path grade and a data volume corresponding to the IO request is greater than a threshold value, dividing the IO request into a plurality of IO sub-requests; and
   selecting target threads matched with the IO sub-requests in quantity from a plurality of threads corresponding to the controllers by using the consistent hashing algorithm, and respectively sending the IO sub-requests which are correspondingly distributed to the target threads.

5. The IO path determination method according to claim 1, wherein acquiring the path grade of the target volume comprises:
   traversing a host path grade table, a backend path grade table and a fault grade table to determine the path grade of the target volume.

6. The IO path determination method according to claim 5, further comprising:
   when the controller is offline or online, updating the host path grade table, the backend path grade table or the fault grade table according to path grade control information of the controller.

7. The IO path determination method according to claim 1, wherein that when the path grade is the backend path grade, selecting the target controller from the controllers by using the consistent hashing algorithm comprises:
   when the path grade is the backend path grade and a quantity of the controllers changes, selecting the target controller from the controllers with the changed quantity by using the consistent hashing algorithm after parameter adjustment.

8. The IO path determination method according to claim 1, wherein a host is a physical host or a virtual host.

9. The IO path determination method according to claim 1, further comprising:
   setting different path grades for different volumes in advance.

10. The TO path determination method according to claim 9, wherein different volumes are marked by corresponding path grade marks, or establishing a path grade lookup table for volumes.

11. The TO path determination method according to claim 1, wherein the host path grade corresponds to one controller and the backend path grade corresponds to one or more controllers.

12. The TO path determination method according to claim 1, wherein the fault grade indicates the volume whose access path is faulty or inaccessible.

13. An electronic device, comprising a memory and one or more processors, the memory stores computer-readable instructions which, when executed by the one or more processors, cause the one or more processors to:
   determine a target volume of an IO request, and acquiring a path grade of the target volume;

when the path grade is a host path grade, send the IO request to a preset optimal controller;

when the path grade is a backend path grade, select a target controller from controllers by using a consistent hashing algorithm, and send the IO request to the target controller; and when the path grade is a fault grade, determine the IO path fault.

14. The electronic device according to claim 13, the computer-readable instructions further cause the one or more processors to:

select the target controller from the controllers belonging to a back end by using the consistent hashing algorithm.

15. The electronic device according to claim 13, the computer-readable instructions further cause the one or more processors to:

when the target controller comprises a plurality of threads, select a target thread from the plurality of threads by using the consistent hashing algorithm;

send the IO request to the target thread.

16. The electronic device according to claim 15, the computer-readable instructions further cause the one or more processors to:

when the path grade is the backend path grade and the data volume corresponding to the IO request is greater than a threshold value, divide the IO request into a plurality of IO sub-requests; and select target threads, matched with the IO sub-requests, in quantity from a plurality of threads corresponding to the controllers by using the consistent hashing algorithm, and respectively send the IO sub-requests which are correspondingly distributed to the target threads.

17. The electronic device according to claim 13, the computer-readable instructions further cause the one or more processors to:

traverse a host path grade table, a backend path grade table and a fault grade table to determine the path grade of the target volume.

18. The electronic device according to claim 17, the computer-readable instructions further cause the one or more processors to:

when the controller is offline or online, update the host path grade table, the backend path grade table or the fault grade table according to path grade control information of the controller.

19. The electronic device according to claim 13, the computer-readable instructions further cause the one or more processors to:

when the path grade is the backend path grade and a quantity of the controllers changes, select the target controller from the controllers with a changed quantity by using the consistent hashing algorithm after parameter adjustment.

20. One or more non-transitory computer-readable storage media storing computer-readable instructions, wherein when the computer-readable instructions are executed by one or more processors, the one or more processors is configured to:

determine a target volume of an IO request, and acquiring a path grade of the target volume;

when the path grade is a host path grade, send the IO request to a preset optimal controller;

when the path grade is a backend path grade, select a target controller from controllers by using a consistent hashing algorithm, and send the IO request to the target controller; and when the path grade is a fault grade, determine the IO path fault.

* * * * *